April 14, 1925.
P. MUELLER ET AL
1,533,886
WATER TRAP AND TRAP CONNECTION
Filed Aug. 19, 1920   6 Sheets-Sheet
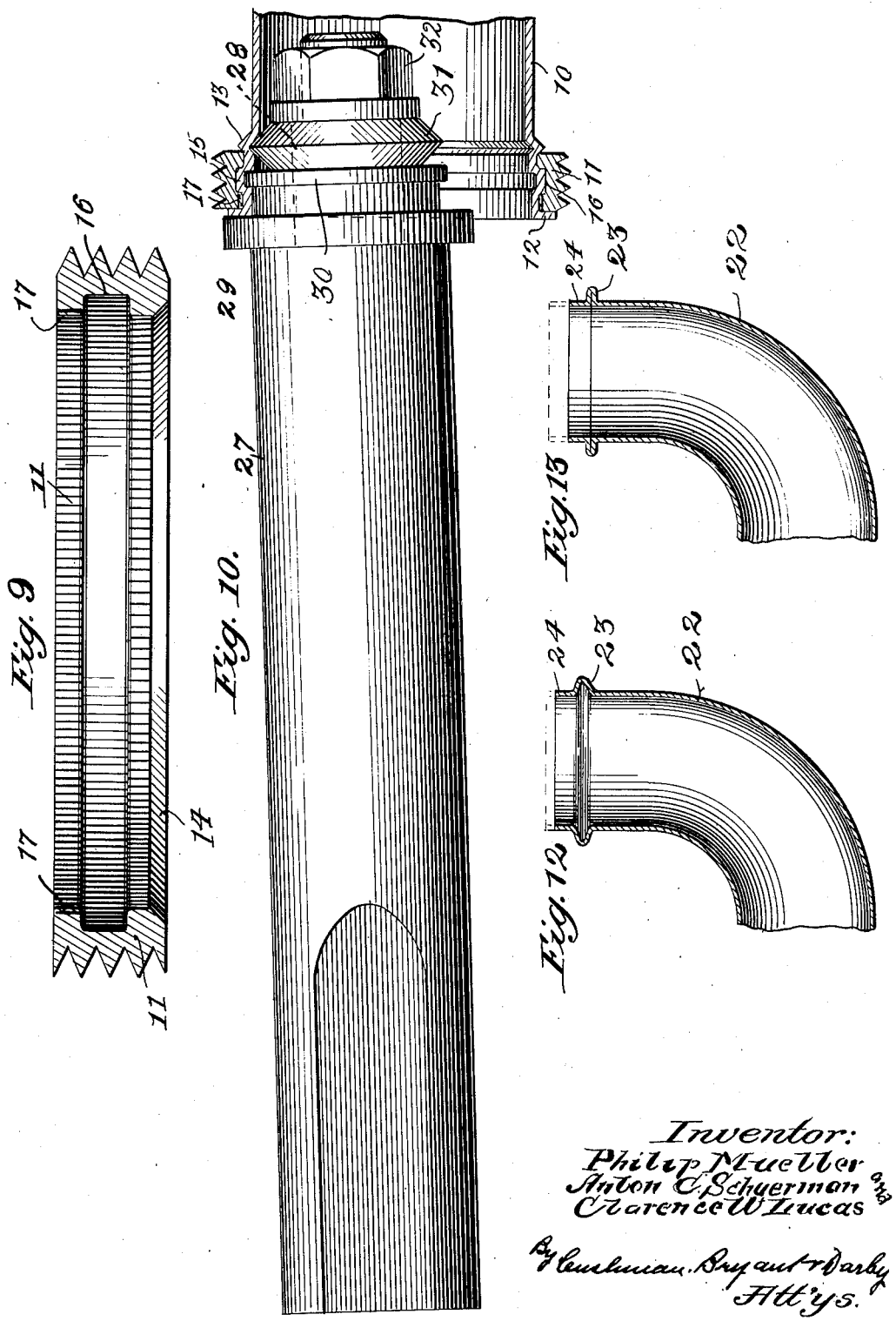

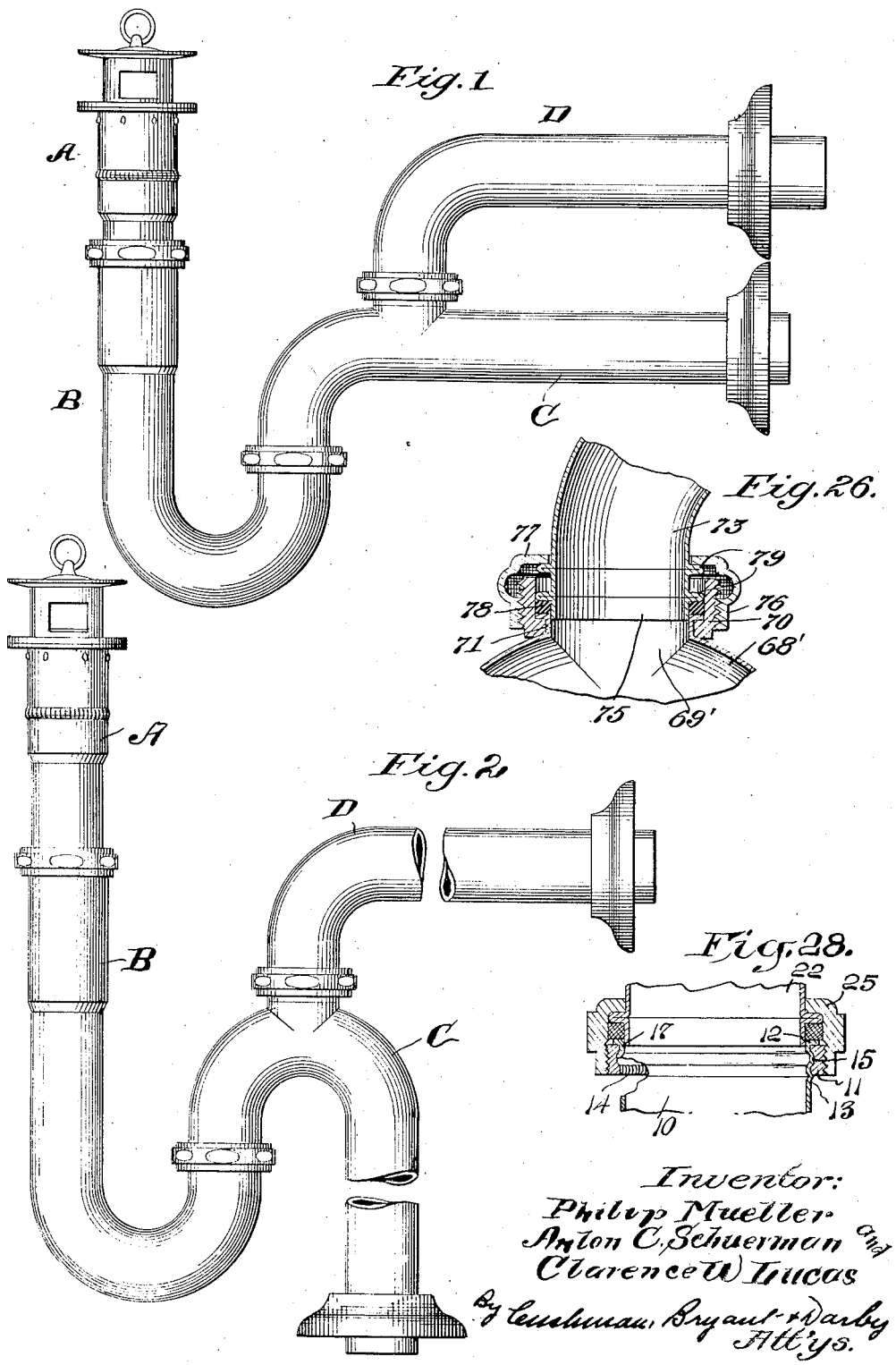

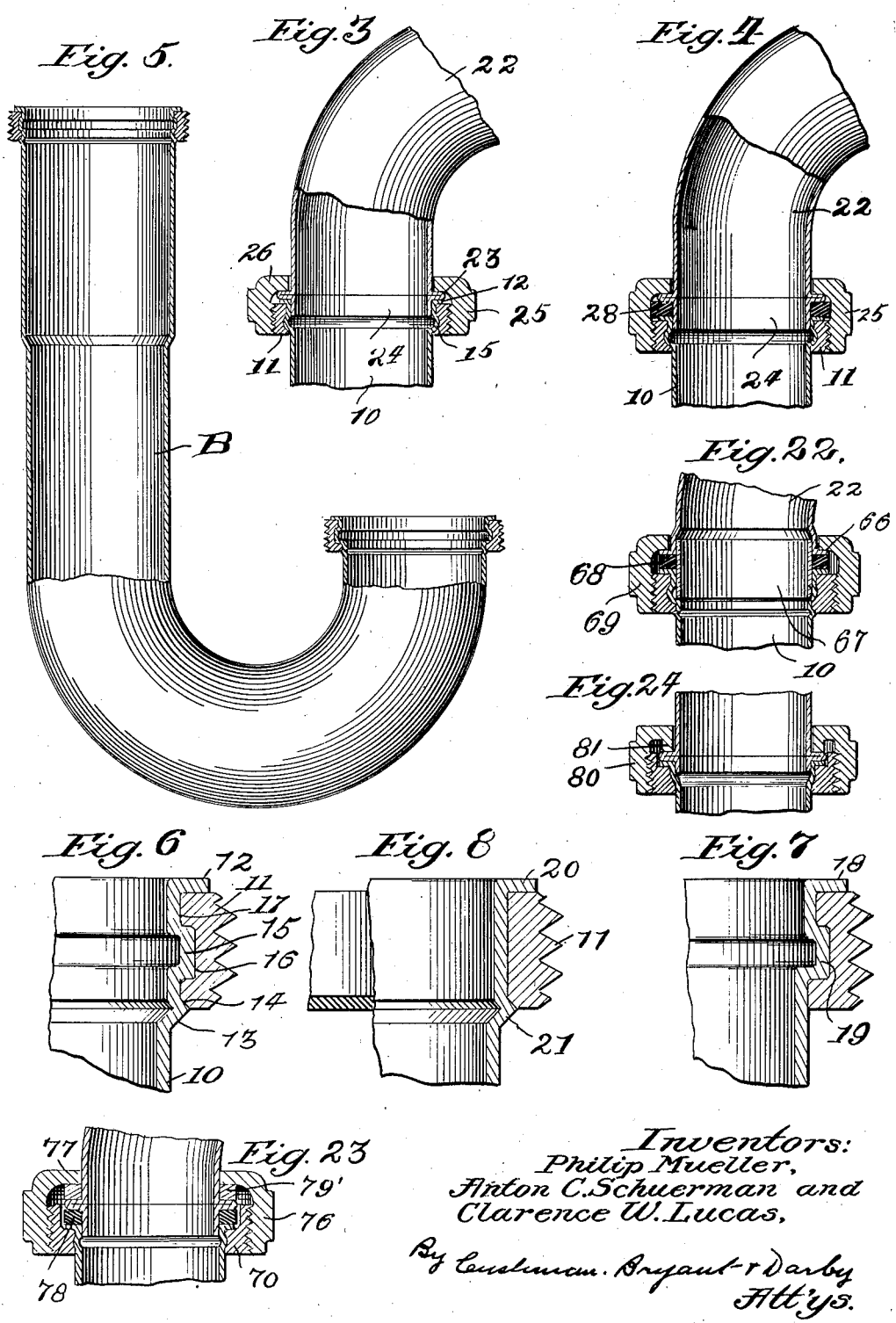

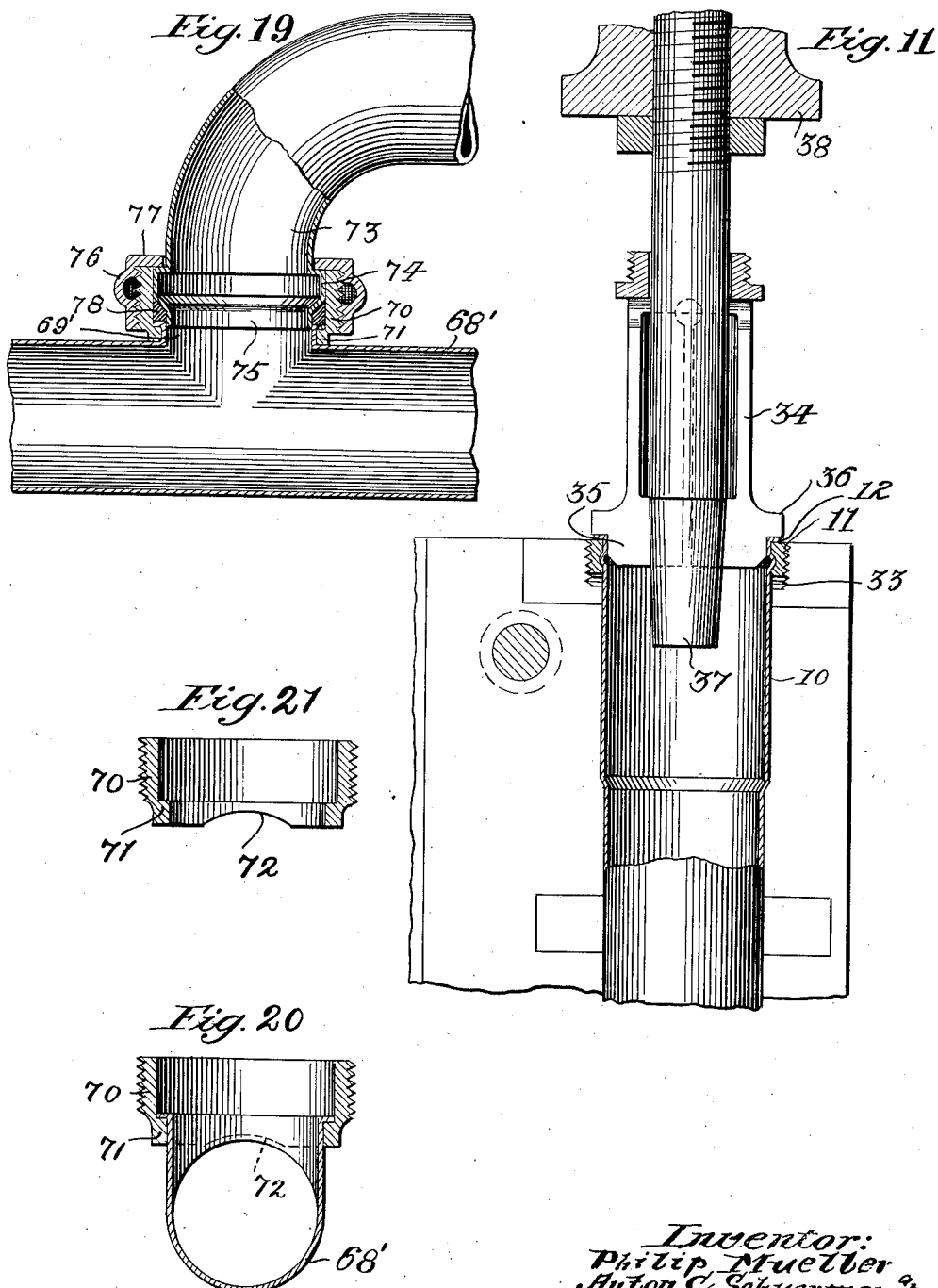

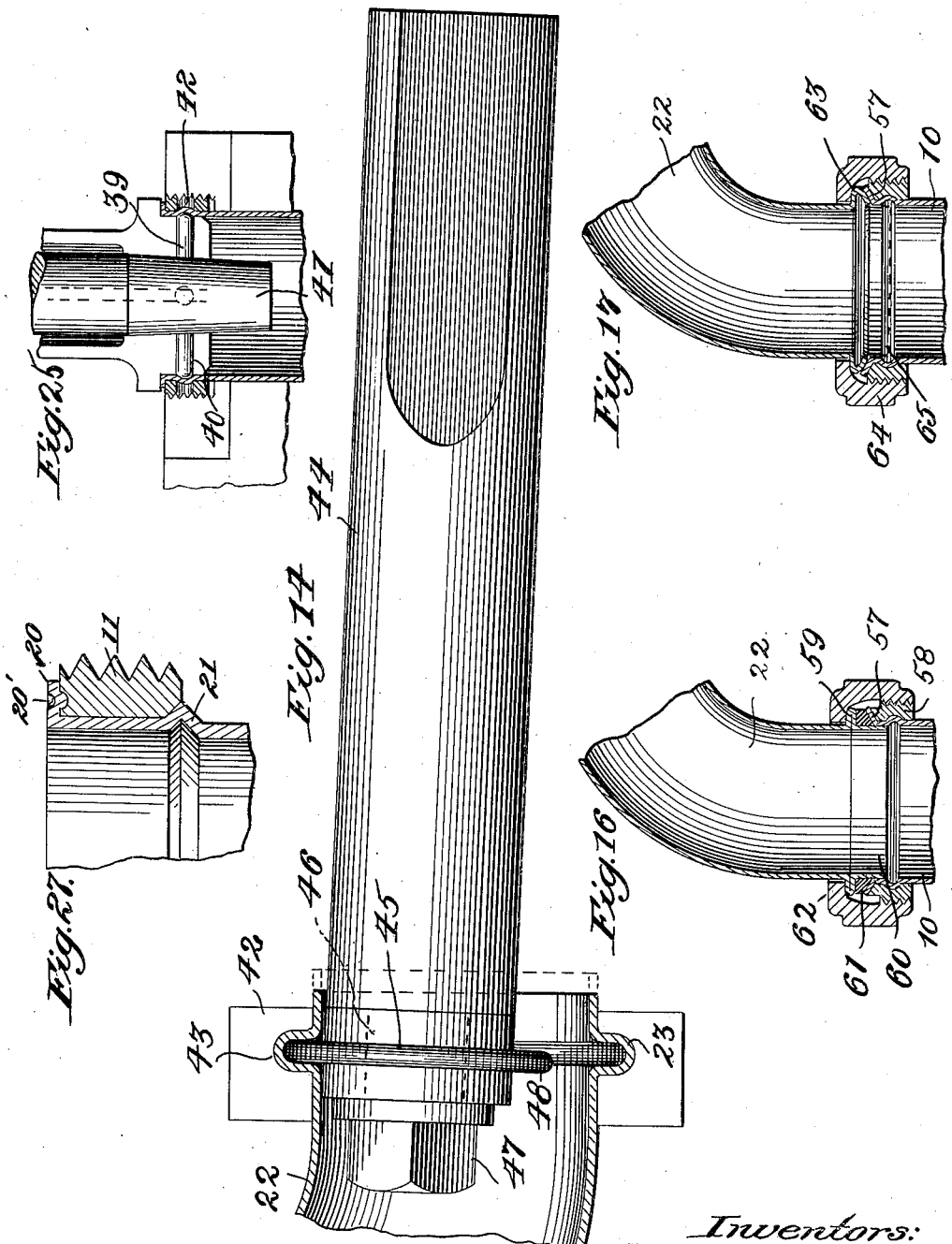

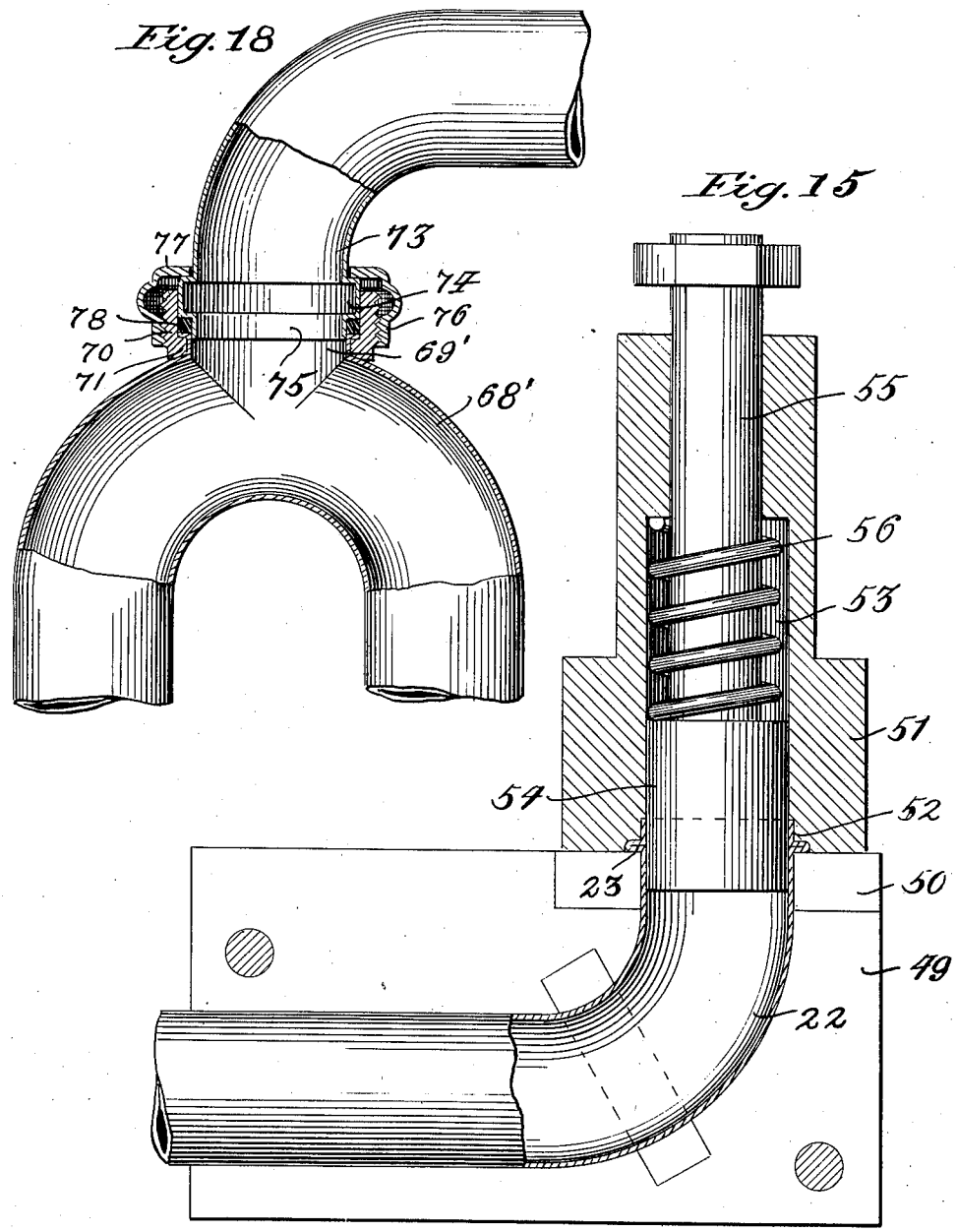

Patented Apr. 14, 1925.

1,533,886

UNITED STATES PATENT OFFICE.

PHILIP MUELLER, ANTON C. SCHUERMANN, AND CLARENCE W. LUCAS, OF DECATUR, ILLINOIS, ASSIGNORS TO ADOLPH MUELLER, TRUSTEE, OF DECATUR, ILLINOIS.

WATER TRAP AND TRAP CONNECTION.

Application filed August 19, 1920. Serial No. 404,539.

*To all whom it may concern:*

Be it known that we, PHILIP MUELLER, ANTON C. SCHUERMANN, and CLARENCE W. LUCAS, citizens of the United States, residing at Decatur, in the county of Macon and State of Illinois, have invented new and useful Improvements in Water Traps and Trap Connections, of which the following is a specification.

The present invention relates to pipe-couplings, bushings, coupling components, and methods of making, and is designed for thin pipes of the type used in plumbing fixtures and particularly in trap work. It will be disclosed herein in connection with traps but it will be understood that the invention may be practiced in connection with lines of similar thin pipe work other than the specific example herein given.

Primarily, it is the object of the invention to provide a coupling of the detachable type in which the pipes, bushings, flanges and coupling nuts are assembled without the use of solder, and yet the necessary fluid-tight condition of the fixture is secured and maintained.

In making up these couplings for the thin pipes now generally used in plumbing work, it is customary to use solder to secure the pipe-end bushings and flanges which are essential to give a proper body for threading and like operations to the pipe, and this is not only an expensive operation, but also, unless great care is exercised, will result in an unsatisfactory coupling. An imperfectly soldered joint or connection leaves, of course, the probability of leakage and also the possibility of the separation of the parts in assembling or in use. Furthermore, in soldered couplings, the use of an acid flux in performing the soldering operation is likely to bring about corrosion of metal and resulting leaks.

It is with a view of correcting some of the difficulties heretofore found in this line of work, that we have devised the present coupling and its essential parts and the methods of making and assembling and securing the component parts together, which will now be described in detail, reference being made to the drawings which accompany and form a part of this disclosure.

In the drawings:

Figure 1 is a view in side elevation of a trap of the P-type, embodying our invention.

Figure 2 is a view in elevation of a trap of the S-type, embodying our invention.

Figure 3 is a sectional view of a coupling made in accordance with our invention.

Figure 4 is a view similar to Figure 3, showing a coupling provided with packing.

Figure 5 is a view in section of one of the members of the trap with a bushing secured thereto.

Figure 6 is an enlarged detail sectional view to show the manner of securing the bushing to the pipe.

Figure 7 is a detail sectional view of a slightly dissimilar form of coupling member.

Figure 8 is another form of connection.

Figure 9 is a detail sectional view of a bushing.

Figure 10 is a view illustrating the method of applying the bushing to a pipe or tube.

Figure 11 is a sectional view to illustrate the final step in the method of applying the bushing to a pipe.

Figure 12 is a sectional view of a pipe having a flange formed therein.

Figure 13 is a sectional view similar to Figure 12, showing one step in the method of forming the flange.

Figure 14 illustrates a method of forming the flange.

Figure 15 is a sectional view to illustrate the final step in the forming of the flange.

Figure 16 is a view in section, showing a slightly different adaptation.

Figure 17 is a detail sectional view of still another form.

Figure 18 is a sectional view of a vent connection.

Figure 19 is a detail sectional view of a vent connection for a straight trap section.

Figure 20 is a sectional view at substantially right angles to the view in Fig. 19.

Figure 21 is a sectional view of the bushing for making the vent connection.

Figure 22 is a view showing another form of coupling.

Figure 23 is a sectional view of a coupling designed particularly for vent connection.

Figure 24 is a view of a slightly different adaptation of the vent connection shown in Fig. 23.

Figure 25 is a conventional view in section to illustrate a step in method of securing the bushing in place.

Figures 26 and 27 illustrate other modifications.

Figure 28 is a sectional view of the coupling showing the serrations in the lower portion of the bushing.

Referring to the drawings by characters, like characters indicating like parts in the various views, Figs. 1 and 2 show the invention applied to two types of traps, Fig. 1 showing what is known to the trade as a, "P-trap", while Fig. 2 shows what is known to the trade as an, "S-trap". In each instance, there is shown conventionally a waste A, a waste pipe connection B, a waste outlet pipe C, and a vent pipe D, the usual parts which make up traps of this type.

The pipe sections of which these traps are made are, as is well known, made in separate pieces, and such pieces are then coupled together to form the complete trap. This is necessary because of the peculiar curved formation of these traps and the several connections which must be made, where such traps, as is now practically universally the case, are made from thin drawn tubing, it being impracticable under present known methods to successfully draw a one piece trap having the curves and connections necessary to proper inlet and outlet, waste and trapping, sections.

Referring to Figs. 3 to 9 inclusive, we have there illustrated a coupling by means of which thin pipes may be bushed, flanged, and coupled, following our methods and construction, without the use of solder, the construction being such that a fluid-tight coupling or joint will be secured and one which will better withstand the strain of setting up the coupling, with less likelihood of breaking down under strains both in assembling and in use. Furthermore, the coupling when completed and ready to be set up is manipulated and the connection made in exactly the same way as the ordinary coupling is screwed up, so that, in the hands of the plumber, so far as assembling and setting up or taking down for cleaning is concerned no problems are presented that are not found in couplings now in use in this class of devices.

Referring particularly to Fig. 3, 10 indicates a pipe-end of thin drawn pipe such as is usually used in forming traps of the type mentioned. A bushing or collar 11 threaded or provided with equivalent nut-engaging devices to receive the coupling nut which is used to draw the parts together and complete the coupling, is secured to (see Fig. 6) the pipe-end 10 by an interlocked, fluid-tight joint made up of the spun down flange 12 at the end of the pipe; and the bead 13 thrown outwardly from the wall to the pipe to engage the opposite end of the bushing. The bushing at this end may be bevelled off or inclined, as at 14, Fig. 6, so that as the bead 13 is thrown outwardly, it will wedge the bushing closely between itself and the flange 12. This incline or bevel 14 is preferably serrated or nicked, as shown in Fig. 28, so as to bite into the bead 13 and lock the pipe and bushing against rotation relative to each other.

Preferably there is provided between the flange 12 and the bead 13, a second projection or rib 15 which is projected outwardly from the wall of the pipe into a recess 16, preferably of the annular form shown, formed in the interior wall of the bushing 11. Formed in this manner, the bushing and pipe are firmly interlocked and are so interlocked as to give a fluid-tight joint, for it will be observed that there is no break or opening in the pipe to permit the escape of fluid, the pipe being continuous to its end flange 12.

The bushing 11 is preferably formed as shown in Fig. 9, being provided with the annular recess 16 on each side of which are the annular projections or ribs, and one of these ribs, preferably the outer one adjacent to flange 12 will be knurled or serrated as at 17 so that as the parts are assembled, preferably by spinning and pressing operations, the serrations or projections will engage and bite into the metal of the pipe, so that bushing and pipe will be firmly locked together and danger of relative rotation avoided.

It will be seen that, assembled as described, the bushing and pipe are firmly interlocked so that there can be no relative longitudinal or circumferential movement. The bushing is tightly clamped between the end flange 12, and the bead 13, and is also interlocked by means of the recess 16, and the projection 15. The bead 13, not only serves as an abutment for the end of the bushing, but also it provides a finished joint between the pipe and the end of the bushing, closing any cracks or interstices between the inner wall of the bushing and the pipe and so preventing the plating solutions, which have a corrosive effect, from getting between the parts and attacking the metal.

In Figure 7, we have shown a development similar to that just described, except that the bead 13 shown in Fig. 6 is omitted and we rely upon the end flange 18 and the rib 19 which engages the recess in the bushing to lock the parts together.

As an alternative construction, there is shown in Fig. 8 a development in which the intermediate rib is dispensed with and the end flange 20 and the bead 21, are relied upon to lock the bushing and pipe together.

The bushing and pipe may be locked by the serrated lower edge on the bushing as heretofore pointed out, and, of course, other locking means may be devised. In Fig. 27 is shown another means for locking the parts to the flange 20. In that disclosure the flange is indented at 20' into the metal of the bushing at one or more points to lock the members together.

Both of these constructions, which are obvious variations of the main idea, have merit, although it will be understood that our preferred form is that shown in Fig. 6.

Referring again to Fig. 3, it will be observed that the pipe section 22, which is to be coupled to the section 10, has formed in its wall, and preferably projecting outwardly therefrom, a flange 23, this pipe section and flange being shown in detail in Figs. 12 and 13. We prefer to form the flange 23, at a point removed from the end 24 of the pipe, so that the end 24 will be received and telescoped within the pipe 10, as clearly appears in Figs. 3 and 4. When thus assembled the flange 23 on the pipe 22 and the end flange 12 on the pipe 10 will be brought into close, intimate contact and form a smooth, tight bearing with the end 24 of the pipe 22, telescoped within the pipe 10 and extending beyond the point of contact or bearing of the flanges 23 and 12 with each other. Slidably and rotatably mounted upon the pipe 22, above the flange 23 is the coupling nut 25 which may be of any ordinary or desired construction, said coupling nut having a collar 26 which engages the flange 23 and being threaded or otherwise formed interiorly to take the thread, or other equivalent connection, on the bushing 11. The coupling nut 25 will be squared, hexed, or otherwise suitably formed on its periphery to receive any appropriate tool for turning it.

As thus constructed, and as assembled in Fig. 3, it will be observed that a solderless, metal to metal, fluid-tight joint will be provided, and one which will take care of the pressures and strains to which it is subjected, without danger of breaking down or deterioration, the arrangement being such that the pipes, joined as described, form a continuous passage with a substantially unbroken wall from end to end. While the bushing and pipe described may be secured together in various ways and by different mechanical operations, we prefer to follow the method described below, utilizing the instrumentalities conventionally shown in Figs. 10 and 11.

Referring to Fig. 10, it will be observed that this discloses the pipe 10, and the bushing 11, substantially at the moment of completion. This condition of assembly is secured by following the steps recited below.

The bushing 11 will, in one form of our invention, have formed therein a recess 16 with adjacent ribs, one of which preferably the outer one, will be knurled or serrated at 17, as heretofore described. This bushing will be slipped on to the pipe-end a sufficient distance to give a projection for forming the end flange 12. As thus assembled, the pipe 10 and bushing 11 will be set up and clamped in fixed relative position in any suitable clamp or holder (not shown). In this position of the parts, the end flange 12 will be turned down, the bead 13 thrown out from the wall of the pipe, and the projection 15 will be forced into the recess 16, in the bushing.

Preferably, the flanging, beading, and ribbing will be done simultaneously by means of an instrumentality capable of performing these operations at the same time, and as one example of a suitable tool, we have shown in Fig. 10 the spindle 27, adapted to be mounted in a suitable machine, such spindle having at its forward end, as indicated in dotted lines in Fig. 10, a reduced portion 28 which receives a spinning tool having the flanging-collar 29, the rib-forming collar 30, and the bead-forming section 31. This tool is preferably held to the spindle by means of the nut 32 threaded or otherwise suitably secured to the reduced section 28. This tool will, by suitable mechanism (not shown), be given a compound movement. It will be given a movement of rotation about its axis and will also be given a shifting orbital movement, so that it will follow an orbital path, gradually spinning down the flange 12 and projecting the rib 15 and the bead 13, to the positions shown in Fig. 10.

By following the method thus described, the parts are quickly and securely interlocked against relative movement and a tight relation of the contacting surface is secured.

It is advisable, however, to subject the tube and bushing to a final operation of internal and end-wise pressure, in order that the spun connection just described will be finally compressed and set.

This final step may be accomplished by any suitable tool or instrumentality, and one convenient device for carrying out this step of the method is shown in Fig. 11. In that figure, the pipe 10 with its bushing 11 are mounted in any suitable clamp or holder so as to prevent relative movement, and preferably the bushing 11 will be engaged with the holder by a vise 33, as shown, the pipe 10 being clamped independently below this vise for the bushing. Within the bushed end of the pipe 10, thus held in the clamp, will be introduced an expanding mandrel 34, preferably made as shown, with a plurality of spring arms which have at their lower ends the pipe-engaging heads or portions 35 and the flange-engaging collar 36. The mandrel 34 is hollow, as shown, to receive a tapered expanding tool 37 arranged to engage the tapering inner walls of the heads 35 of the mandrel. The tapering tool or punch 37 is carried by any suitable reciprocating part 38 which, when the expander 34 is in the position shown in Fig. 11, will be reciprocated, forcing the punch 37 downward so as to spread the arms of the mandrel 34 outwardly, thus exerting an outward pressure, through the medium of the heads 35, and a downward pressure through the medium of the collar 36. This operation or step of the method results in a final tightening of the pipe and bushing, seating the flange 12 smoothly and firmly and what is of importance forcing the pipe into intimate contact with the knurled or serrated projection of the bushing.

In the development shown in Fig. 25, a slightly modified operation is contemplated. The pipe and bushing in assembled condition will be held as before and the mandrel will be of the same general construction, except that it will have lateral passages 39 through it to receive punch pins 40. Said pins 40 will be of such length that when the tapered tool 41 is forced into the mandrel to spread it, the pins 40 will be forced outwardly, projecting the metal of the pipe into the openings 42 radially disposed in the wall of the bushing in register with the pins 40.

The method of forming the outstanding flange of the other pipe section 22 is illustrated in Figs. 14 and 15, and while the method may be practiced with any suitable tool or instrument, one convenient instrumentality for carrying out the method in its several steps in shown in the figures referred to.

The pipe 22 will be clamped in a suitable die or holder with that portion which is to be flanged projecting between two flange-forming die plates 42' provided with the registering annular recesses 43, as shown in Fig. 14. Within the pipe thus held in the flanging clamp a suitable flanging tool will be introduced, that tool, as shown in the present example, comprising a spindle 44 mounted for rotation and also for travel in an orbital path, in any suitable machine (not shown), for imparting these movements to it. At its end the spindle will be provided with a beading or flanging tool 45 mounted upon a projection 46 on the spindle and fixed thereto by any suitable means, as the nut 47, threaded to the end of the projection 46. Rotation of the spindle 44 and its movement in an orbital path will, by means of the projecting annular rib 48 on the tool 45 project outwardly from the wall of the tube 22 into the annular die recess 43, the flange 23 of substantially the form shown in Fig. 14.

It will be observed that the flange, after being formed by the spinning operation referred to, will be in partially open condition, and in order to close the flange and bring it to the form shown in Figs. 3 and 4, another step, following our method, is necessary, and that is the step of finally collapsing or flattening the spun flange produced by the step just described and illustrated in Fig. 14.

While this flattening down of the flange may be accomplished in various ways, we have shown one convenient instrumentality for doing this in Fig. 15.

Referring to Fig. 15, 49 indicates any suitable clamp or holder having die plates 50, and designated to receive a pipe having the preliminarily formed flange 23 produced in its wall by the step just described, the pipe being so disposed in the flattening die as that the flange 23 rests upon suitable die plates 50, as shown in Fig. 15. Above the flattening die thus described is a reciprocating die-member 51, having a recess 52 of suitable shape and dimensions to receive the upstanding end of the pipe and the bead. The die member 51 is reciprocated by any suitable mechanism (not shown), and has, within a central chamber 53, a reciprocating mandrel or core 54 of the internal diameter of the pipe 22. This mandrel 54 is carried by a stem 55 traversing the die-member 51, a spring 56 engaging a shoulder within the die-member 51. With the pipe in the position described, the die-member 51 will be moved downwardly, and initially the mandrel 54 will enter the flanged end of the pipe, fitting snugly therein, so as to prevent any inward buckling or collapse of the pipe under pressure. Continued movement of the die-member 51 downwardly will engage that member with the partially spun flange 23 and the end of the pipe, as shown in Figs. 12 and 14, compressing and flattening the flange to the completed form shown in Figs. 13 and 15.

In Fig. 16 is illustrated a slight variation of the generic idea heretofore described, in that the pipe 10 instead of having its end flange bent at right angles, as in forms heretofore described, has an end flange 57 which is inclined or oblique to the wall of the pipe, the bushing 58 having its end correspondingly inclined. The pipe 22 will be flanged at 59, so as to give a somewhat longer telescoping extension 60, and between the bead 59 and the inclined flange 57 will be placed any suitable packing 61, which, as coupling nut 62 is set up to tighten the connection, will wedge against the flange 57 to seal the joint, the extension 60 on the pipe 22, however, giving a metal to metal contact with the inner wall of the pipe 10 and incasing the packing.

In Fig. 17, the pipe 10, and the bushing will be formed, as shown in Fig. 16, with the inclined flange 57, but the pipe 22, instead of being provided with a collapsed and flattened flange, will have formed therein, preferably at its end, the open flange 63, the upper surface of which will be inclined or curved to seat tightly against the inclined flange 57 on the pipe 10, when the coupling nut 64 draws the pipes together. While the flange 63, is preferably formed at the end of the pipe, it may if desired be formed at a point removed from the end, and in that event the extreme end 65 (see dotted lines, Fig. 17) of the pipe will telescope with the pipe 10, as in the other forms described.

In Fig. 22, the pipe 10 and the bushing will be formed and assembled as heretofore described, but instead of providing the end of the pipe 22 with a collapsed and flattened flange at a point removed from its end, provision is made whereby a pipe having an end flange 66 may be utilized. This is accomplished by providing a short pipe section 67 telescoped within the bushing end of the pipe and projecting above the same. In the angular recess between the top of the section 67 and the bushed pipe the packing 68 will be placed and upon it will rest the flange 66 of the pipe 22, the coupling nut 69 engaging the flange on the pipe and the bushing and locking the parts together in the manner described.

The forming of vent connections for traps has been a matter of some difficulty owing to the fact that this connection must be formed through the curved wall of the pipe and many devices, including special fittings, have been employed.

By following the method disclosed herein and using the instrumentalities described, we are able to form the vent aperture without the use of solder and without highly specialized fittings, and yet secure a fluid and gas-pipe joint free from interstices or projections for lodgment of material.

The vent aperture will be formed by piercing the pipe 68' at substantially a right-angle to the longitudinal axis of the pipe, and spinning out an integral, pipe-like projection 69'. It is obvious that there is but little metal for this operation and that the length of the projection is of necessity limited, as the metal available for this projection must be spun out of the wall of the pipe.

The bushing 70 will be formed, as shown, with a collar 71 projecting inwardly at or near the lower end thereof so that when the bushing is slipped in place over the pipe-like projection 69 the collar at the end of the bushing will drop below the top of the projection, which will then be flanged down upon the collar to lock the bushing in place.

With this construction the small amount of metal which it is possible to spin out to form the projection 69' will suffice for the flanged lock to secure the bushing in place, and since the body of the bushing extends upwardly from the collar, which is gripped by the flange, ample threaded surface is provided to receive the coupling nut.

In order to lock the bushing in place and hold it against angular movement on the vent projection, it is preferably made with curved seats 72 on its under side, which engage the curved surface of the pipe 68' on each side of the projection 69' so that, when the nipple is flanged down and tightened, bushing 70 will, by reason of engagement of the curved seats 72 with the correspondingly curved pipe, be further locked against rotation or angular movement.

The collar may be, as in the other forms, if desired knurled or serrated at its inner edge, so that when the parts are tightened by the tightening mandrel heretofore described, they will be firmly locked together against longitudinal and rotary movement.

The end 73 of the vent pipe as shown in Figs. 18 and 19, will have the outwardly projected flange 74, which is formed by following the methods heretofore described, and will be inserted within the bushing 70 with its ends 75 preferably telescoping the vent projection 69' as shown. The coupling nut 76 is rotatably mounted on the pipe 73 with its collar 77 engaging the flange 74, said nut 76 being threaded or otherwise formed to engage the exteriorly threaded or equivalently formed bushing 70. Preferably, although not necessarily, there will be provided a packing 78, between the lower side of the flange 74, and the flanged-over end of the vent projection, so that a fluid and gas-tight joint will be provided. It will be understood that packing 78, may be dispensed with and a metal to metal joint formed by bringing the collar 74 down into contact with the flange on the vent projection, as, with the construction disclosed, a fluid and gas-tight joint will be provided.

It will be observed that in the vent pipe construction just described, the flange 74 is not a flattened flange as heretofore described, but is a relatively wide open flange, this being necessary to fill up the bushing vertically and give the coupling nut 76 with its collar 77 a grip on the flange for the tightening of the parts together, it being obvious that the flange must be so extended in order to project above the top of the bushing.

In the form of the invention shown in Fig. 26 the parts are identical with the construction shown in Fig. 18 except that instead of the open collar 74 disclosed in Fig. 18 there is provided a plurality of flattened flanges 79, one of which, namely, the lower one in Fig. 26, bears upon the packing while the upper one is engaged by the collar of the coupling member.

In the development shown in Fig. 23, a construction is illustrated in which a pipe having a flattened flange can be used. In that construction the parts, with the exception of the telescoping pipe, are the same, but the flanged pipe has, above the flange, a filler ring or stop 79' which is of sufficient thickness to project above the top of the bushing and provide a gripping seat for the coupling nut so that when the nut is turned it will tighten the parts.

In Fig. 24, this filler or stop is shown as formed integral with the coupling nut 80, said coupling nut having projecting downwardly from its collar a filler ring or stop 81 which is spaced laterally from the threaded wall of the coupling nut to permit the nut to be set up and which, when the nut is screwed down, will bear at its lower edge against the flange and tighten the parts. While the ring or stop 81 is here shown as a continuous ring, it is obvious that an equivalent construction would be a single finger projecting downwardly or a plurality of circumferentially spaced fingers.

We claim:

1. A water trap comprising inlet and outlet pipe sections one of which has a bushing interlocked therewith by a flange at the end of the pipe and a projection in the wall of the pipe below said flange; means for non-rotatably securing said bushing to one of the pipe sections, the other of said sections having an integral flange formed in the wall thereof at a point removed from its end and disposed in opposed relation to said end-flange; and a coupling-nut rotatably engaged with said flanged section and detachably connected with said bushing.

2. A water trap comprising inlet and outlet pipe sections one of which has a threaded bushing interlocked therewith by an integral, outwardly-turned end-flange and an annular rib projected outwardly from the wall of the pipe below said flange into engagement with said bushing; means for non-rotatably securing said bushing to one of said pipe sections, the other section having an integral flange projected outwardly from the wall thereof at a point removed from its end to permit the end of said second section to telescope in said bushed section; and a coupling-nut rotatably engaged with said flanged section and threaded to said bushing.

3. A water trap comprising an inlet section having an interiorly recessed and exteriorly threaded bushing interlocked therewith by an integral end-flange spun outwardly over the end and an integral rib spun into the interiorly recessed wall of said bushing; means for non-rotatably securing said bushing to one of said pipe sections an outlet section having an integral, outwardly-spun, pipe-like projection in the wall thereof to form a vent opening, a threaded bushing secured to said projection by a flanged connection; a vent pipe having an integral, outwardly-turned flange and a telescoping extension; and a coupling-nut engaging said flanged vent pipe and threaded to said bushing.

4. A water trap comprising inlet and outlet pipe sections one of which has a threaded bushing interlocked therewith by an integral, outwardly-turned end-flange and an annular rib projected outwardly from the wall of the pipe below said flange into engagement with said bushing; said bushing having a serrated pipe engaging surface secured to one of said sections the other section having an integral flange projected outwardly from the wall thereof at a point removed from its end to permit the end of said second section to telescope in said bushed section; a packing interposed between said flanges, means preventing the packing from being forced inwardly, and a coupling nut rotatably engaged with said flange sections and threaded to said bushing.

In testimony whereof we have hereunto set our hands.

PHILIP MUELLER.
ANTON C. SCHUERMANN.
CLARENCE W. LUCAS.